(12) United States Patent
Brockmann

(10) Patent No.: US 7,702,876 B2
(45) Date of Patent: Apr. 20, 2010

(54) SYSTEM AND METHOD FOR CONFIGURING MEMORY DEVICES FOR USE IN A NETWORK

(75) Inventor: Mark Brockmann, Scotts Valley, CA (US)

(73) Assignee: Xyratex Technology Limited, Havant, Hampshire (GB)

( * ) Notice: Subject to any disclaimer, the term of this patent is extended or adjusted under 35 U.S.C. 154(b) by 467 days.

(21) Appl. No.: 11/662,949

(22) PCT Filed: Sep. 22, 2005

(86) PCT No.: PCT/US2005/034211

§ 371 (c)(1),
(2), (4) Date: Mar. 20, 2007

(87) PCT Pub. No.: WO2006/036811

PCT Pub. Date: Apr. 6, 2006

(65) Prior Publication Data

US 2008/0040541 A1 Feb. 14, 2008

Related U.S. Application Data

(60) Provisional application No. 60/611,804, filed on Sep. 22, 2004.

(51) Int. Cl.
*G06F 13/00* (2006.01)

(52) U.S. Cl. .................................... 711/170; 711/105
(58) Field of Classification Search ................ 711/105, 711/170
See application file for complete search history.

(56) References Cited

U.S. PATENT DOCUMENTS

| 5,422,762 A | 6/1995 | Jerbic |
| 5,819,298 A | 10/1998 | Wong et al. |
| 5,832,525 A | 11/1998 | Wong et al. |
| 6,138,126 A | 10/2000 | Hitz et al. |
| 2001/0016841 A1 | 8/2001 | Karasudani |
| 2002/0010830 A1* | 1/2002 | Nizar et al. .................. 711/105 |
| 2003/0131226 A1* | 7/2003 | Spencer et al. .............. 713/100 |
| 2004/0030693 A1* | 2/2004 | Toda .............................. 707/4 |
| 2004/0107417 A1* | 6/2004 | Chia et al. ................... 717/171 |
| 2006/0010011 A1* | 1/2006 | Ullom et al. ..................... 705/2 |

* cited by examiner

*Primary Examiner*—Reba I Elmore
(74) *Attorney, Agent, or Firm*—Dickstein Shapiro LLP

(57) ABSTRACT

A system for and method of providing a flexible means of using and storing file configuration metadata in a RAID network, so that the memory system does not restrict the metadata to exact format or location in memory. A RAID controller is operable to power-up a memory device, to determine whether the memory device is new and, if so, to build and configure a file system on the memory device. Configuration data is communicated to the RAID controller. If a configuration update is needed, the RAID controller updates the configuration file of the memory device.

12 Claims, 4 Drawing Sheets

Current invention

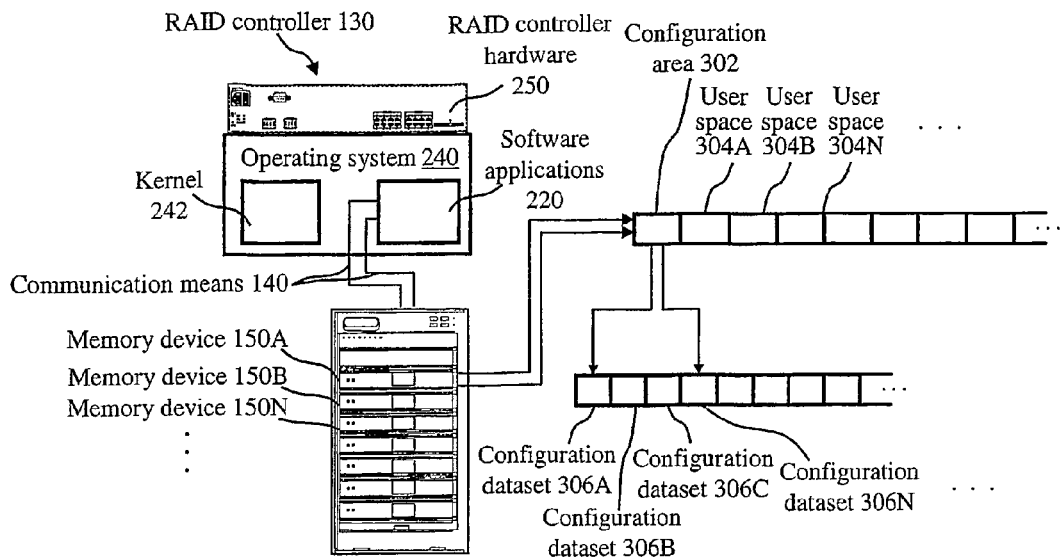
Fig. 3A - Background
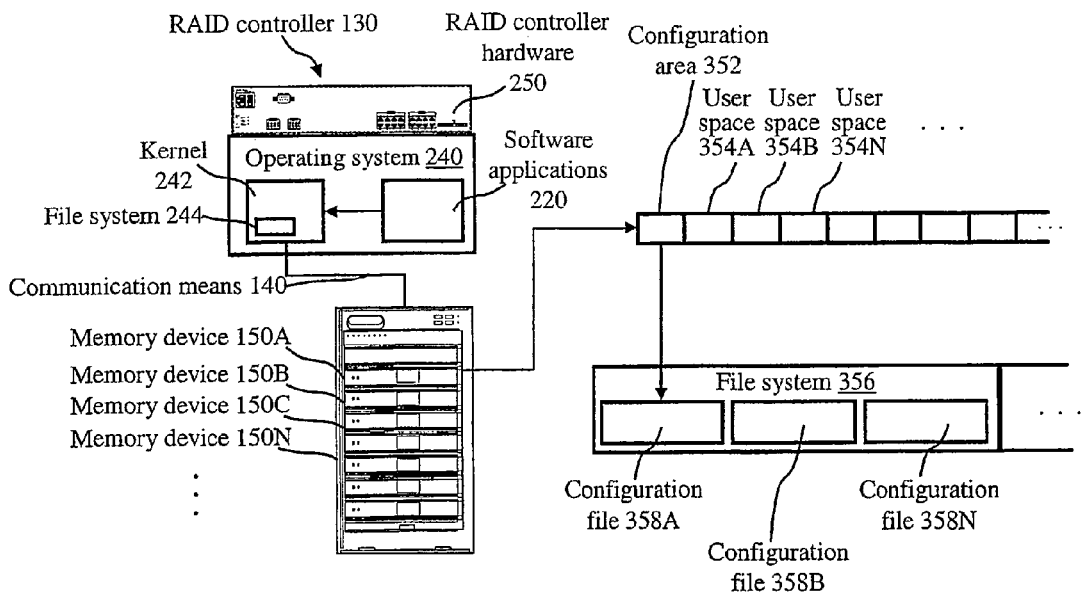
Fig. 3B – Current invention

SYSTEM AND METHOD FOR CONFIGURING MEMORY DEVICES FOR USE IN A NETWORK

CROSS-REFERENCE TO RELATED APPLICATIONS

This application claims the benefit of U.S. Provisional Application Ser. No. 60/611,804 filed Sep. 22, 2004 in the U.S. Patent and Trademark Office, the entire content of which is incorporated by reference herein.

FIELD OF THE INVENTION

The present invention relates to a flexible means of using and storing file configuration metadata in a redundant arrays of inexpensive disks (RAID) network and, more specifically, to a system and method of configuring memory devices for use in a RAID environment.

BACKGROUND OF THE INVENTION

Currently, RAID systems are the principle storage architecture for large networked computer storage systems. RAID architecture was first documented in 1987 when Patterson, Gibson and Katz published a paper entitled, "A Case for Redundant Arrays of Inexpensive Disks (RAID)" (University of California, Berkeley). Fundamentally, RAID architecture combines multiple small, inexpensive disk drives into an array of disk drives that yields performance exceeding that of a Single Large Expensive Drive (SLED). Additionally, this array of drives appears to the computer as a single logical storage unit (LSU) or drive. Five types of array architectures, designated as RAID-1 through RAID-5, were defined by the Berkeley paper, each providing disk fault-tolerance and each offering different trade-offs in features and performance. In addition to these five redundant array architectures, a non-redundant array of disk drives is referred to as a RAID-0 array. RAID controllers provide data integrity through redundant data mechanisms, high speed through streamlined algorithms, and accessibility to the data for users and administrators.

File systems within RAID networks maintain an abstracted view of the files and directory structure within mass-storage to a user, such that information can be effectively managed by the application without user knowledge of the physical memory locations of the files. File systems allow users to create files and directories, as well as delete, open, close, read, write and/or extend the files in memory. File systems also maintain security over the files that they maintain and, in most cases, manage control lists for a file. Volume management was developed in the late 1980s to enable the creation and management of file systems larger than a single disk, typically via striping. Striping is a method of concatenating multiple drives into one logical storage unit. Striping involves partitioning each drive's storage space into stripes, which may be as small as one sector (512 bytes) or as large as several megabytes. These stripes are then interleaved so that the combined space is composed alternately of stripes from each drive. In effect, the storage space of the drives is shuffled like a deck of cards. The type of application environment, I/O or data intensive, determines whether large or small stripes should be used. The choice of stripe size is application dependant and affects the real-time performance of data acquisition and storage in mass storage networks. In data intensive environments and single-user systems which access large records, small stripes (typically one 512-byte sector in length) can be used so that each record will span across all the drives in the array, each drive storing part of the data from the record. This causes long record accesses to be performed faster, because the data transfer occurs in parallel on multiple drives. Applications, such as on-demand video/audio, medical imaging, and data acquisition, which utilize long record accesses, will achieve optimum performance with small stripe arrays.

Striping requires interaction between the volume manager and a disk management system that configures and allocates space within a RAID memory unit. There are numerous methods of file system configuration and allocation. "Metadata" is data that describes data, and in this application, it is configuration and allocation information that describes the position and attributes of user data on the memory unit. Typically, an operating system stores metadata in a fixed location on the memory device that records stripe and configuration information for a given file. A volume is a logical unit of data storage that may correspond to a physical memory device, such as a disk drive, or that may include fractional or multiple memory devices. When a volume is brought online upon power-up, for example, the information needed for the volume to be available to a host is read from an area of memory on the volume designated as the configuration space. The configuration data includes, for example, volume size and file attributes, such as read/write, or read only. As a result, when the volume returns online, it will be configured as it was prior to the power cycle, and its data will be made available to the user. Currently, however, the number, type, and location of configuration data is vendor specific; its functionality is limited and is rigidly fixed for the life of the disk. In practice, however, there are a number of instances in which it would be desirable to have configuration data flexibly altered. For example, configuration data may be optimized for a given storage application. Unique configurations to accommodate different applications are known as "personalities." As changes to a memory unit application occur, changes to configuration personality data is also likely to occur. In current technology, any changes to the configuration data require costly maintenance; specifically, the disk needs to be re-formatted prior to any changes being made to the configuration data. These limitations to the configuration data are problematic for the providers of RAID network services because of the dynamic nature of RAID networks. What is needed is a flexible means of updating the configuration for a disk drive in RAID network, such that the metadata is not restricted to exact format or location in memory. Further, what is needed is a way of providing RAID network configuration data, beyond what is currently available, so that the RAID network can be optimized for special applications.

An example of an invention for a method of disk configuration for a RAID network is U.S. Pat. No. 6,138,126, entitled, "Method for Allocating Files in a File System Integrated with a RAID Disk Sub-System." The '126 patent describes a method for integrating a file system with a RAID array that exports precise information about the arrangement of data blocks in the RAID subsystem. The file system examines this information and uses it to optimize the location of blocks as they are written to the RAID system. Thus, the system uses explicit knowledge of the underlying RAID disk layout to schedule disk allocation. The method uses separate current-write location (CWL) pointers for each disk in the disk array. The pointers simply advance through the disks as writes occur. The algorithm used has two primary goals. The first goal is to keep the CWL pointers as close together as possible and thereby improve RAID efficiency by writing to multiple blocks in the stripe simultaneously. The second goal is to allocate adjacent blocks in a file on the same disk and thereby improve read back performance.

While the '126 patent provides an efficient means of disk configuration for a RAID system, the invention does not provide a flexible means of providing configuration metadata in a RAID system in a way in which the metadata is not restricted to exact format or location in memory. As a result, the '126 patent does not ensure that the RAID file configuration is independent of the memory devices used to implement the network.

Configuration metadata stored on storage devices often needs to be updated because of configuration changes or enhancements. Currently, the process of updating configuration metadata can create situations in which the larger size of a new format of configuration metadata may overwrite other metadata, forcing the other metadata to be moved to new locations. This requires that both configuration metadata layouts are tracked to ensure that corruption does not occur. It also requires that newer versions of firmware have awareness of all older metadata formats so that devices with an older metadata format scheme can be handled properly by newer firmware. What is needed is a way to simplify the storage and retrieval of storage device metadata.

It is therefore an object of the invention to provide a way to simplify the storage and retrieval of storage device metadata. More specifically, it is an object of the invention to provide a flexible means of configuring a disk drive in RAID network, such that the metadata is not restricted to exact size, format or location on a storage device.

It is yet another object of the invention to provide a flexible means of updating the configuration for a disk drive in RAID networks, such that the metadata is not restricted to exact format or location in memory. Furthermore, it is yet another object of the invention to provide RAID network configuration data, beyond what is currently available, so that the RAID network can be optimized for special applications.

BRIEF SUMMARY OF THE INVENTION

The present invention provides a method for configuring memory devices in a networked storage system is provided. The method includes the step of building a file system on an un-configured memory device. Metadata is stored in the built file system of the memory device. The stored metadata is also communicated to a network controller file system. The method also includes the step of determining that the stored metadata requires updating. If required, the stored metadata is updated via communication between the network controller file system and the file system of the memory device.

The present invention also provides a system for configuring memory devices in a networked storage system. The system includes an un-configured memory device and a network controller which includes a file system. The network controller is configured to build a file system on the un-configured memory device and to store metadata in the file system of the memory device. The network controller may also be configured to determine whether the stored metadata requires updating and to update the stored metadata via communication between the network controller file system and the file system of the memory device. The system also includes communication means for transferring data between the file system of the network controller and the un-configured memory device.

These and other aspects of the invention will be more clearly recognized from the following detailed description of the invention which is provided in connection with the accompanying drawings.

BRIEF DESCRIPTION OF THE DRAWINGS

FIGS. 3A and 3B illustrate an exemplary view of select elements in a RAID networked storage system that are relevant in configuring the memory devices in a RAID networked storage system, in accordance with an embodiment of the invention.

DETAILED DESCRIPTION OF THE INVENTION

The present invention is a system and method for using and storing file configuration metadata in a RAID network. More specifically, the invention relates to a flexible means of using and storing file configuration metadata in a RAID network. The invention relates further to a system and method of configuring memory devices for use in a RAID environment.

Figure 1:
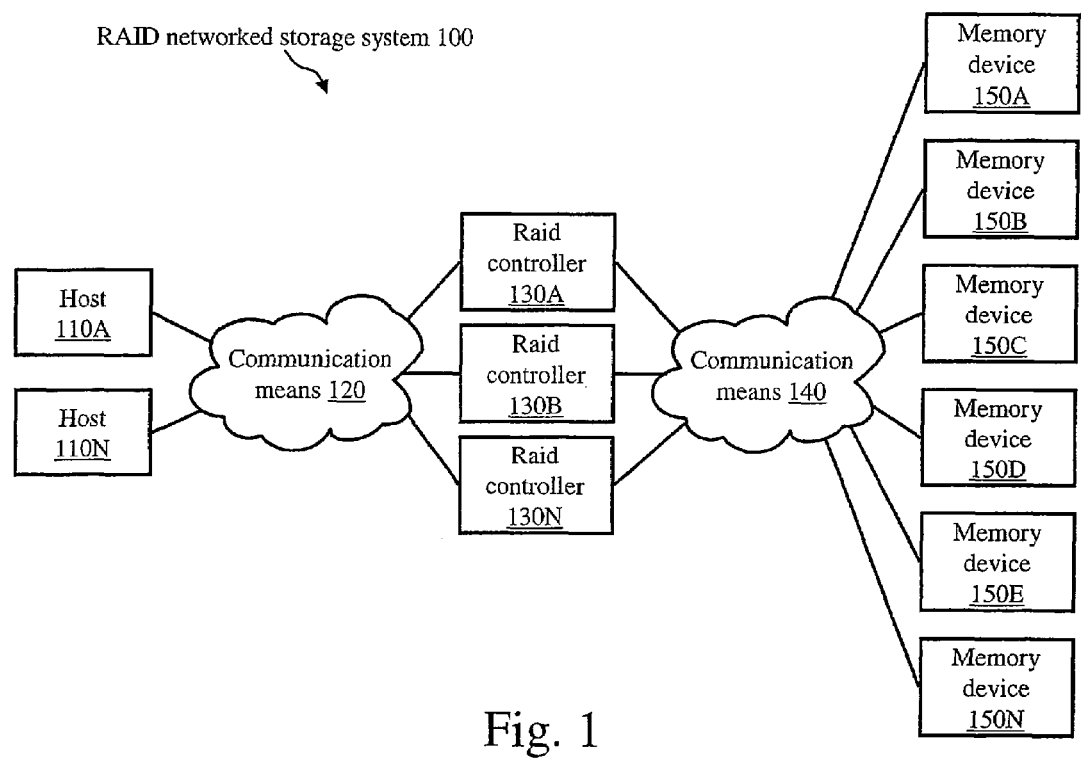
FIG. 1 illustrates a block diagram of a conventional RAID networked storage system in accordance with an embodiment of the invention.

FIG. 1 is a block diagram of a conventional RAID networked storage system 100 that combines multiple small, inexpensive disk drives into an array of disk drives that yields superior performance characteristics, such as redundancy, flexibility, and economical storage. Conventional RAID networked storage system 100 includes a plurality of hosts 110A through 110N, where 'N' is not representative of any other value 'N' described herein. Hosts 110 are connected to a communications means 120, which is further coupled via host ports (not shown) to a plurality of RAID controllers 130A and 130B through 130N, where 'N' is not representative of any other value 'N' described herein. RAID controllers 130 are connected through device ports (not shown) to a second communication means 140, which is further coupled to a plurality of memory devices 150A through 150N, where 'N' is not representative of any other value 'N' described herein. Memory devices 150 are housed within enclosures (not shown).

Hosts 110 are representative of any computer systems or terminals that are capable of communicating over a network. Communication means 120 is representative of any type of electronic network that uses a protocol, such as Ethernet. RAID controllers 130 are representative of any storage controller devices that process commands from hosts 110 and, based on those commands, control memory devices 150. RAID controllers 130 also provide data redundancy, based on system administrator programmed RAID levels. This includes data mirroring, parity generation, and/or data regeneration from parity after a device failure. Physical to logical and logical to physical mapping of data is also an important function of the controller that is related to the RAID level in use. Communication means 140 is any type of storage controller network, such as iSCSI or fibre channel. Memory devices 150 may be any type of storage device, such as, for example, tape drives, disk drives, non-volatile memory, or solid state devices. Although most RAID architectures use disk drives as the main storage devices, it should be clear to one skilled in the art that the invention embodiments described herein apply to any type of memory device.

In operation, host 110A, for example, generates a read or a write request for a specific volume, (e.g., volume 1), to which it has been assigned access rights. The request is sent through communication means 120 to the host ports of RAID controllers 130. The command is stored in local cache in, for example, RAID controller 130B, because RAID controller 130B is programmed to respond to any commands that request volume 1 access. RAID controller 130B processes the request from host 110A and determines the first physical memory device 150 address from which to read data or to write new data. If volume 1 is a RAID 5 volume and the command is a write request, RAID controller 130B generates new parity, stores the new parity to the parity memory device 150 via communication means 140, sends a "done" signal to host 110A via communication means 120, and writes the new host 110A data through communication means 140 to the corresponding memory devices 150.

Figure 2:
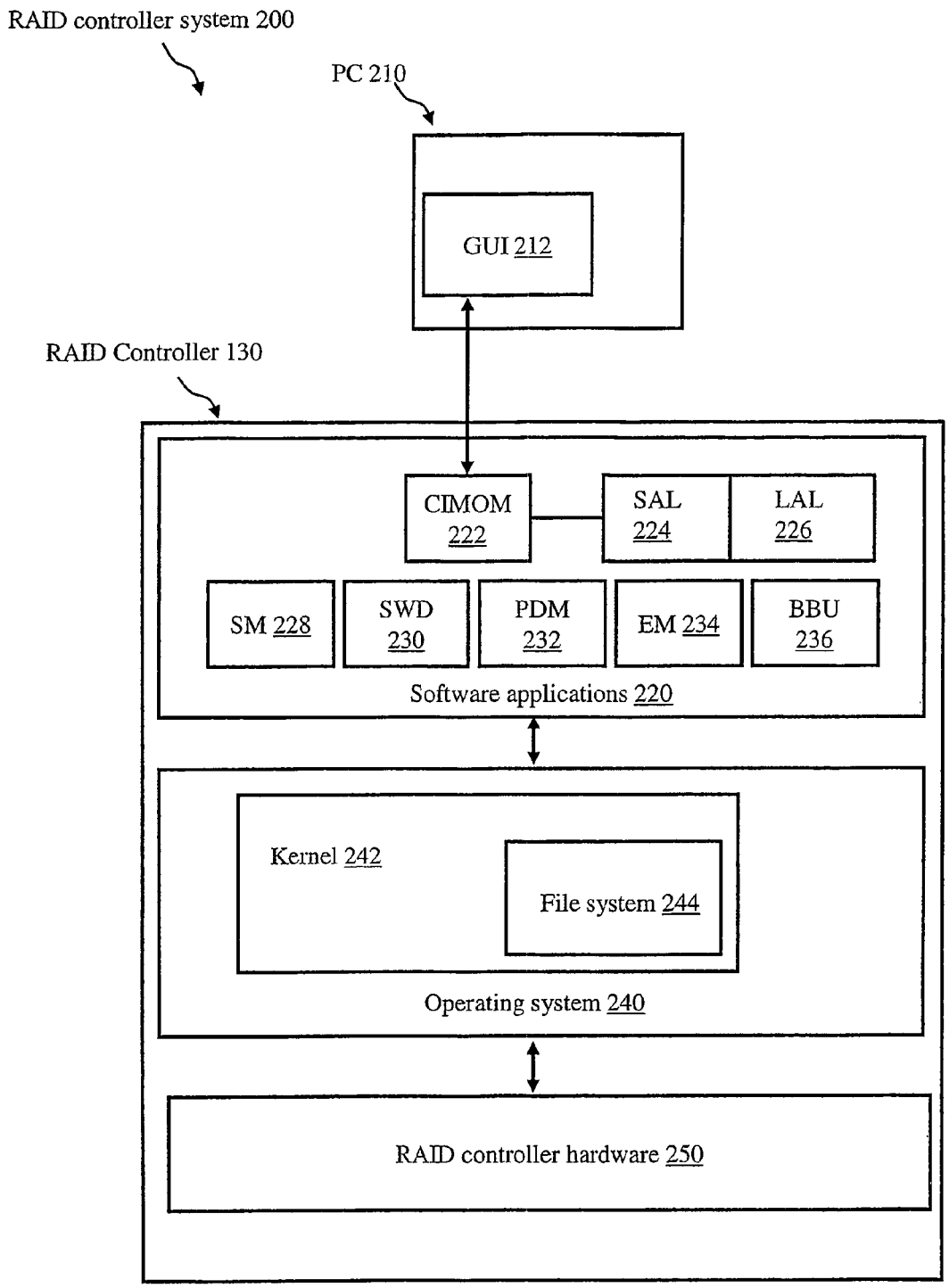
FIG. 2 illustrates a block diagram of a RAID controller system in accordance with an embodiment of the invention.

FIG. 2 is a block diagram of a RAID controller system 200. RAID controller system 200 includes RAID controllers 130 and a general purpose personal computer (PC) 210. PC 210 further includes a graphical user interface (GUI) 212. RAID controllers 130 further include software applications 220, an operating system 240, and a RAID controller hardware 250. Software applications 220 further include a common information module object manager (CIMOM) 222, a software application layer (SAL) 224, a logic library layer (LAL) 226, a system manager (SM) 228, a software watchdog (SWD) 230, a persistent data manager (PDM) 232, an event manager (EM) 234, and a battery backup (BBU) 236.

GUI 212 is a software application used to input personality attributes for RAID controllers 130. GUI 212 runs on PC 210. RAID controllers 130 are representative of RAID storage controller devices that process commands from hosts 110 and, based on those commands, control memory devices 150. As shown in FIG. 2, RAID controllers 130 are an exemplary embodiment of the invention; however, other implementations of controllers may be envisioned here by those skilled in the art. RAID controllers 130 provide data redundancy, based on system-administrator-programmed RAID levels. This includes data mirroring, parity generation, and/or data regeneration from parity after a device failure. RAID controller hardware 250 is the physical processor platform of RAID controllers 130 that executes all RAID controller software applications 220 and that include a microprocessor, memory, and all other electronic devices necessary for RAID control. Operating system 240 is an industry-standard software platform, such as Linux, for example, upon which software applications 220 can run. Operating system 240 delivers other benefits to RAID controllers 130. Operating system 240 contains kernel 242 and utilities, such as a file system 244, that provides a way for RAID controllers 130 to store and transfer files. Software applications 220 contain algorithms and logic necessary for the RAID controllers 130 and are divided into those needed for initialization and those that operate at run-time. Initialization software applications 220 include the following software functional blocks: CIMOM 222, which is a module that instantiates all objects in software applications 220 with the personality attributes entered, SAL 224, which is the application layer upon which the run-time modules execute, and LAL 226, a library of low-level hardware commands used by a RAID transaction processor.

Software applications 220 that operate at run-time include the following software functional blocks: SM 228, a module that carries out the run-time executive; SWD 230, a module that provides software supervision function for fault management; PDM 232, a module that handles the personality data within software applications 220; EM 234, a task scheduler that launches software applications 220 under conditional execution; and BBU 236, a module that handles power bus management for battery backup.

FIGS. 3A and 3B show two exemplary views of RAID networked storage system 100 and include select elements from both FIG. 1 and FIG. 2 that are relevant in configuring the memory devices in a RAID networked storage system. FIG. 3A shows a prior art configuration. FIG. 3B shows the configuration of the current invention.

FIG. 3A illustrates a prior art RAID controller application accessing configuration data directly. FIG. 3A illustrates how configuration data is currently read upon volume creation. FIG. 3A includes RAID Controller 130, which further includes RAID controller hardware 250, operating system 240, kernel 242, and software applications 220, communication means 140, a plurality of memory devices 150A through 150N, where 'N' is not representative of any other value 'N' described herein, a configuration area 302, a plurality of user spaces 304A through 304N, where 'N' is not representative of any other value 'N' described herein, and a plurality of configuration datasets 306A through 306N, where 'N' is not representative of any other value 'N' described herein.

Configuration area 302 is the area of memory devices 150 that describes the configuration of the user data stored on memory devices 150 (for example, on memory device 150A). Configuration area 302 further includes a plurality of configuration datasets 306. In one example, configuration area 302 is 64 KB in size. Configuration datasets 306 include specifications related to the data, such as volume size and file attributes, that are stored on memory devices 150. Configuration datasets 306 are proprietary binary structures that are laid out on a disk drive in the same way in which they would be represented in memory. When configuration datasets 306 are accessed, the data is copied into the memory of RAID controller 130 and RAID controller 130 utilizes that data, as is. In one example, configuration dataset 306A contains information related to volume size on memory device 150A, configuration dataset 306B contains information related to the number of volumes on memory device 150A, configuration dataset 306C contains information related to error handling on memory device 150A, and other configuration datasets (306N) contain information related to other configuration details of memory device 150A.

The format of configuration area 302 is rigid, vendor specific, and difficult to modify. It is desirable that position, size data content and data types contained in these datasets not change so that software applications 220 will not need to handle multiple formats. For example, if data were added to a particular configuration dataset (e.g. 306B), the configuration dataset could grow to a point at which other configuration datasets would need to be moved to prevent them from being overwritten. If a data type was changed, (e.g. from an integer to a text type) the size of the configuration dataset could be affected, which could result in the movement of other configuration datasets. Each time a particular configuration dataset (e.g. 306B) moves, the format of configuration area 302 changes, and this becomes one more format that software applications 220 need to keep track of, since memory devices 150 with an older format may be moved to a controller with newer versions of software applications 220, and must still be handled properly.

User space 304 is the area of memory devices 150 where data is stored. User space 304 may contain a variety of data including, but not limited to, audio files (such as .wav, or .mp3), video files (such as .mpg or .avi), document files (such as those created with MSWord, MSExcel, MSPowerPoint, or Corel's Wordperfect, for example), image files (such as those created with CAD/CAM software, Adobe Photoshop, digital cameras, or scanners, for example) or database files (files related to database applications, such as MSSQL Server, Oracle, or IBM).

In one example referring to initialization of the system in FIG. 3A, during the power up of memory devices 150A, software applications 220 within RAID controller 130 request access to configuration area 302 and configuration datasets 306 stored on memory device 150A via communications means 140. Within memory device 150A, software applications 220 review configuration area 302 and further review configuration datasets 306 within configuration area 302. Configuration dataset 306A includes the specification of the data within user space 304B on memory device 150A. With this location information, software applications 220 access the data from user space 304B and return the data to host 110A.

While the system shown in FIG. 3A is functionally operable as described, it does not provide for flexibility, as the requirements of RAID networked storage system 100 change over time. For example, if the configuration of memory device 150A changes, the particular configuration datasets 306 within configuration area 302 must also change. This lack of adaptability is directly related to the structure of configuration area 302, which does not allow for modification of configuration datasets 306.

FIG. 3B illustrates a RAID controller using a file system to manage configuration data. FIG. 3B includes RAID controller 130, which further includes RAID controller hardware 250, operating system 240, kernel 242, file system 244, software applications 220, communication means 140, a plurality of memory devices 150A through 150N, where 'N' is not representative of any other value 'N' described herein, a configuration area 352, a plurality of user spaces 354A through 354N, where 'N' is not representative of any other value 'N' described herein, a file system 356, and a plurality of configuration files 358A through 358N, where 'N' is not representative of any other value 'N' described herein.

Configuration area 352 is reserved space in which to install a file system, which provides a flexible way for a RAID controller system (such as RAID controller system 200, for example) to manage the configuration data for memory devices 150. In one example, configuration area 352 is 128 MB in size.

File system 356 is built within configuration area 352. In one example, file system 356 is built with an operating system and includes a directory structure, such as the Linux make file system (MKFS) command.

Configuration files 358 are stored in the directory structure of file system 356. Configuration files 358 contain data that describe the location and properties of data stored in user spaces 354. Configuration files 358 contain the same sort of information as do configuration datasets 306; however, because they are files housed in file system 356, configuration files 358 are readily updated and saved back to configuration area 352. Additionally, configuration files 358 may or may not be in contiguous locations in configuration area 352 on memory device 150.

In one example referring to initialization of the system in FIG. 3B, during power up of memory devices 150A, software applications 220 within RAID controller 130 request access to configuration area 352 and configuration file 358A stored on memory devices 150. The request is routed to kernel 242 and file system 244. File system 244 forwards the request from software applications 220 to memory devices 150 via communications means 140. Configuration area 352 receives the request and forwards it to file system 356, which in turn locates configuration file 358A and provides access to the file.

Communication between file system 244 and file system 356 is typical of file system communication between computing devices. The communication between file system 244 and file system 356 employs data communication standards of extensible markup language (XML) and secure object access protocol (SOAP) to pass data between the two file systems. A detailed discussion of a related communication is disclosed in U.S. Provisional Application Ser. No. 60/611,807, filed Sep. 22, 2004, entitled "XML/SOAP INTERPROCESS INTER-CONTROLLER COMMUNICATION." The nature of the communication between file system 356 and file system 244 with XML and SOAP allows for changes to both the order and the type of the data fields within each configuration file 358. The method of operating the system in FIG. 3B is described in reference to FIG. 4.

Figure 4:
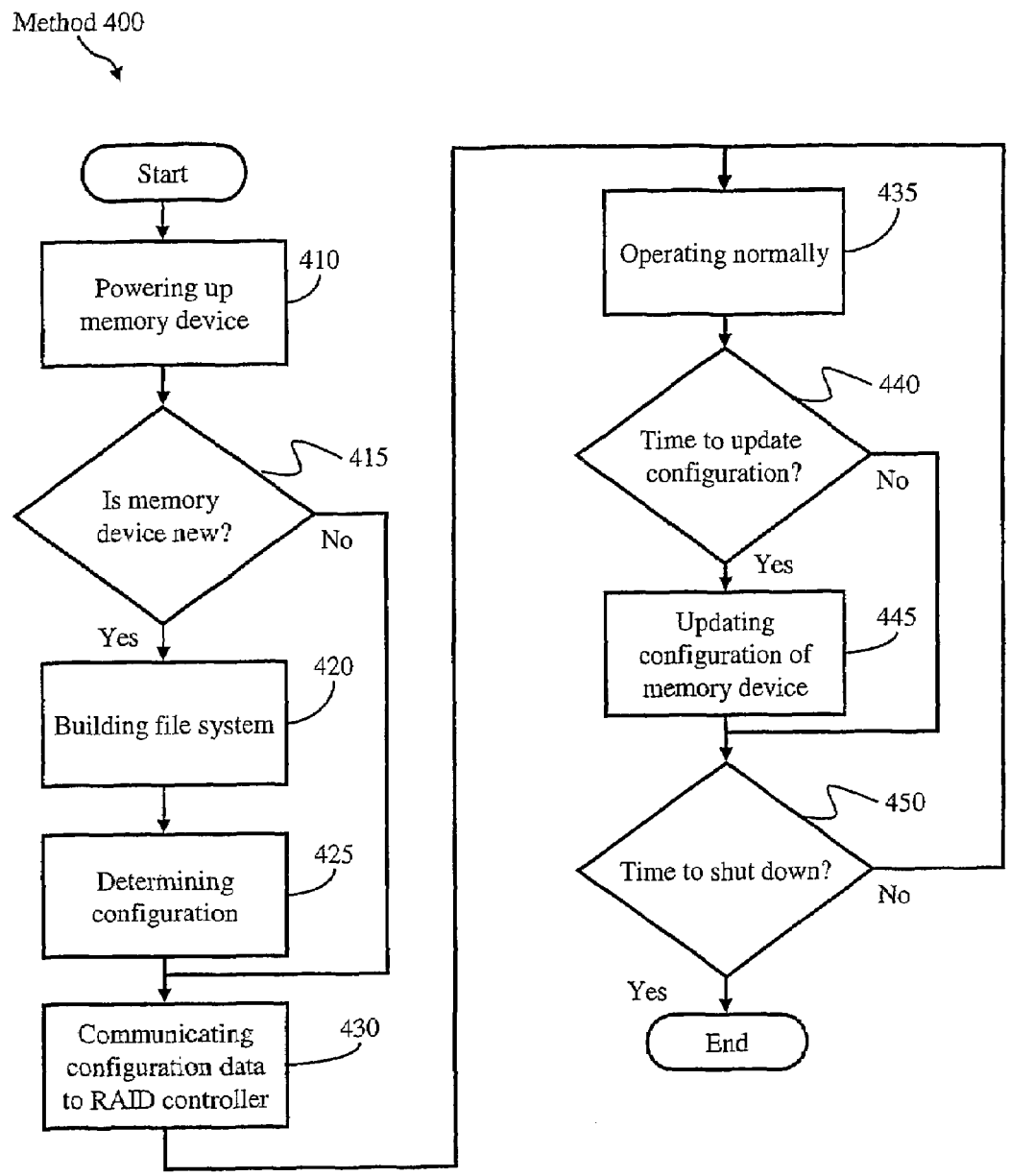
FIG. 4 illustrates a flow diagram of a method of operating and configuring memory devices in a RAID networked storage system, in accordance with an embodiment of the invention.

FIG. 4 illustrates a flow diagram of a method 400 of operating and configuring memory devices in RAID networked storage system 100.

Method 400 includes the steps of:

Step 410: Powering Up Memory Device

In this step, memory devices 150 are powered up in RAID networked storage system 100. Method 400 proceeds to step 415.

Step 415: Is Memory Device New?

In this decision step, RAID controller 130 determines whether memory device 150 is a new device. In one example, this determination is made when file system 244 performs a file system check (such as Unix command FSCK) on memory device 150. In this example, if there is a file system installed on memory device 150, RAID controller 130 determines that the device is not new. If the device is new, method 400 proceeds to step 420; if the device is not new, method 400 proceeds to step 430.

Step 420: Building File System

In this step, file system 244 builds file system 356 on memory device 150. In one example, this is done when file system 244 performs a make file system command (such as Unix command MKFS) via communications means 140 to create file system 356 on memory device 150. Method 400 proceeds to step 425.

Step 425: Determining Configuration

In this step, RAID controller 130 determines the appropriate configuration for memory device 150. In one example, RAID controller 130 requires that memory device 150 be utilized in a streaming video application. This means that configuration files 358 within configuration area 352 are tailored to support streaming video. Method 400 proceeds to step 430.

Step 430: Communicating Configuration Data to Raid Controller

In this step, file system 356 communicates configuration data contained in configuration files 358 to file system 244 within RAID controller 130. In one example, file system 356 communicates with file system 244 by using XML and SOAP protocols, as described above and in U.S. Provisional Application 60/611,807. Method 400 proceeds to step 435.

Step 435: Operating Normally

In this step, memory device 150 is finished with all its initialization steps and is operating normally according to the parameters of RAID networked storage system 100. After a predetermined amount of time, method 400 proceeds to step 440.

Step 440: Time to Update Configuration?

In this decision step, RAID controller 130 determines, based on requests from host 110, whether it is time to update the configuration of memory device 150. If it is time to update the configuration, method 400 proceeds to step 445; if not, method 400 proceeds to step 450. In one example, RAID controller 130 determines that it needs to change the configuration of memory device 150A according to changes in usage patterns of RAID networked storage system 100. For example, streaming video data requests may become less frequent than database record requests and, thus, lower priority is required for memory device 150A. In one example, the configuration is changed any number of times within method 400. The number of times the configuration is changed is only limited by the number of times that a user of host 110 males changes that require saving metadata. Examples of the sorts of changes that require a configuration update include, but are not limited to: creating a volume, deleting a volume, expanding a volume, using a spare (either automatically or manually), and the like.

Step 445: Updating Configuration of Memory Device

In this step, the configuration of memory device 150 is updated. In this example, software applications 220 send a request to update the configuration of memory device 150A via kernel 242 and file system 244. This request is processed by file system 356, and configuration files 358 are updated and saved as needed. Method 400 proceeds to step 450.

Step 450: Time to Shut Down?

In this decision step, RAID controller 130 determines whether it is time to shut down by determining whether any requests to shut down have been received. If a shut-down command has been received, method 400 ends; if not, method 400 returns to step 435.

Although the present invention has been described in relation to particular embodiments thereof, many other variations and modifications and other uses will become apparent to those skilled in the art. Therefore, the present invention is to be limited not by the specific disclosure herein, but only by the appended claims.

What is claimed is:

1. A method for configuring memory devices in a RAID networked storage system, comprising:
   using a RAID controller to build a directory-based file system in a configuration area of an un-configured memory device in a RAID networked storage system, the configuration area being separate from a data storage user space on the memory device;
   determining, using the RAID controller, a configuration for storing data in the data storage user space of the memory device based;
   storing metadata in files of the file system of the configuration area of the memory device, the metadata describing the configuration of stored data on the memory device; and
   communicating the stored metadata files to the RAID controller.

2. The method of claim 1, further comprising:
   determining, by the RAID controller, whether the configuration for storing data on the memory device requires updating; and
   if the configuration requires updating, updating the stored metadata files in the configuration area via communication between the RAID controller and the configuration area file system of the memory device.

3. The method of claim 1, wherein the step of updating results in changes to an order and type of metadata within the stored metadata files of the configuration area file system of the memory device.

4. The method of claim 1, wherein the step of communicating occurs via extensible markup language (XML) and secure object access protocol (SOAP).

5. The method of claim 1, wherein the configuration is determined according to changes in usage patterns of the RAID networked storage system.

6. The method of claim 1, further comprising the step of determining if a memory device is an un-configured memory device or a configured memory device.

7. A system for configuring memory devices in a RAID networked storage system, comprising:
   an un-configured memory device with a configuration area and a separate data storage user space on the memory device;
   a RAID controller which includes a file system, the RAID controller configured to build a directory-based file system in the configuration area of the un-configured memory device and to store metadata files in the file system of the configuration area in the memory device, the metadata describing a configuration of stored data in the data storage user space of the memory device; and
   communication means for transferring data between the file system of the RAID controller and the file system of the configuration area of the un-configured memory device.

8. The system of claim 7, wherein the RAID controller is further configured to determine whether the configuration of the memory device requires updating and to update the stored metadata files via communication between the network controller file system and the file system of the memory device.

9. The system of claim 7, wherein the RAID controller is configured to recorder and replace the metadata within the stored metadata files of the configuration area file system of the memory device.

10. The system of claim 7, wherein the network controller is configured to use extensible markup language (XML) and secure object access protocol (SOAP) in order to transfer data over the communication means.

11. The system of claim 7, wherein the configuration of the memory device is updated by the RAID controller according to changes in usage patterns of the RAID networked storage system.

12. The system of claim 7, wherein the RAID controller is configured to determine if a memory device is an un-configured memory device or a configured memory device.

* * * * *